(12) United States Patent
Orady et al.

(10) Patent No.: US 8,903,223 B1
(45) Date of Patent: Dec. 2, 2014

(54) VIDEO DRIVER OVER A NETWORK

(75) Inventors: Aly E. Orady, San Francisco, CA (US); Matthew B. Debski, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 347 days.

(21) Appl. No.: 13/168,848

(22) Filed: Jun. 24, 2011

Related U.S. Application Data

(60) Provisional application No. 61/359,785, filed on Jun. 29, 2010.

(51) Int. Cl.
*H04N 9/80* (2006.01)
*H04N 21/4402* (2011.01)

(52) U.S. Cl.
CPC . *H04N 21/440281* (2013.01); *H04N 21/44029* (2013.01)

USPC .......................................................... 386/248

(58) Field of Classification Search
CPC .................. H04N 21/440263; H04N 21/6332; H04N 21/658; H04N 21/440261
See application file for complete search history.

(56) References Cited

U.S. PATENT DOCUMENTS

| | | | |
|---|---|---|---|
| 6,526,097 B1 * | 2/2003 | Sethuraman et al. | 375/240.2 |
| 7,110,357 B2 * | 9/2006 | Yao et al. | 370/230 |
| 8,566,389 B2 * | 10/2013 | Orady et al. | 709/203 |

* cited by examiner

*Primary Examiner* — Huy T Nguyen
(74) *Attorney, Agent, or Firm* — Sughrue Mion, PLLC

(57) ABSTRACT

It is determined at a display driver level that a video is being played. A frame processing rate at a local frame buffer is measured, wherein the frame processing rate is dependent on a performance condition. A video frame is dropped from the local frame buffer based at least in part on the frame processing rate. Frames are output from the local frame buffer for video playback.

27 Claims, 12 Drawing Sheets

VIDEO DRIVER OVER A NETWORK

CROSS REFERENCE TO OTHER APPLICATIONS

This application claims priority to U.S. Provisional Patent Application No. 61/359,785 entitled VIDEO DRIVER OVER A NETWORK filed Jun. 29, 2010 which is incorporated herein by reference for all purposes.

BACKGROUND OF THE INVENTION

It is a standard and/or desired feature for computers and computing devices to have visual, video and/or multimedia capability. Digital networks allow interoperability between devices such as terminals, printers, headsets, network attached storage, speakers, security cameras, home media systems, remote monitors, client and server machines, and videophones. Unfortunately, the cost of configuring and maintaining digital networks and devices is expensive.

To reduce manufacturing cost, maintenance cost and reduce security vulnerability, thin network clients may be designed such that they do not require an instruction based processing element, such as a central processing unit ("CPU"), microcontroller unit ("MCU"), or digital signal processor ("DSP"), to receive or interpret any messages, including driver level messages. Visual, video and/or multimedia performance may be degraded by network conditions. There remains a need for such thin clients to retain visual, video and/or multimedia capability at a reasonable performance even given degraded network conditions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Multimedia or video output capability is an important feature of many computing devices. Without loss of generality the example of a video driver and video device is adopted throughout this specification as a specific example of a multimedia driver and a multimedia hardware device, or any driver associated with a device with a buffer.

In some embodiments, thin clients are designed such that they do not require an instruction based processing element, such as a CPU, MCU or DSP, to receive or interpret any messages, including driver level messages. These simple thin clients are inexpensive to manufacture, inexpensive to maintain in a thin client network, and reduce security vulnerability. Because they do not have an instruction based processing element, these thin clients associated with a display device do not run a display driver on the client but instead are associated with a display driver on the client's host system, across a network. A display driver operating a remote display device over a network is disclosed.

Figure 1:
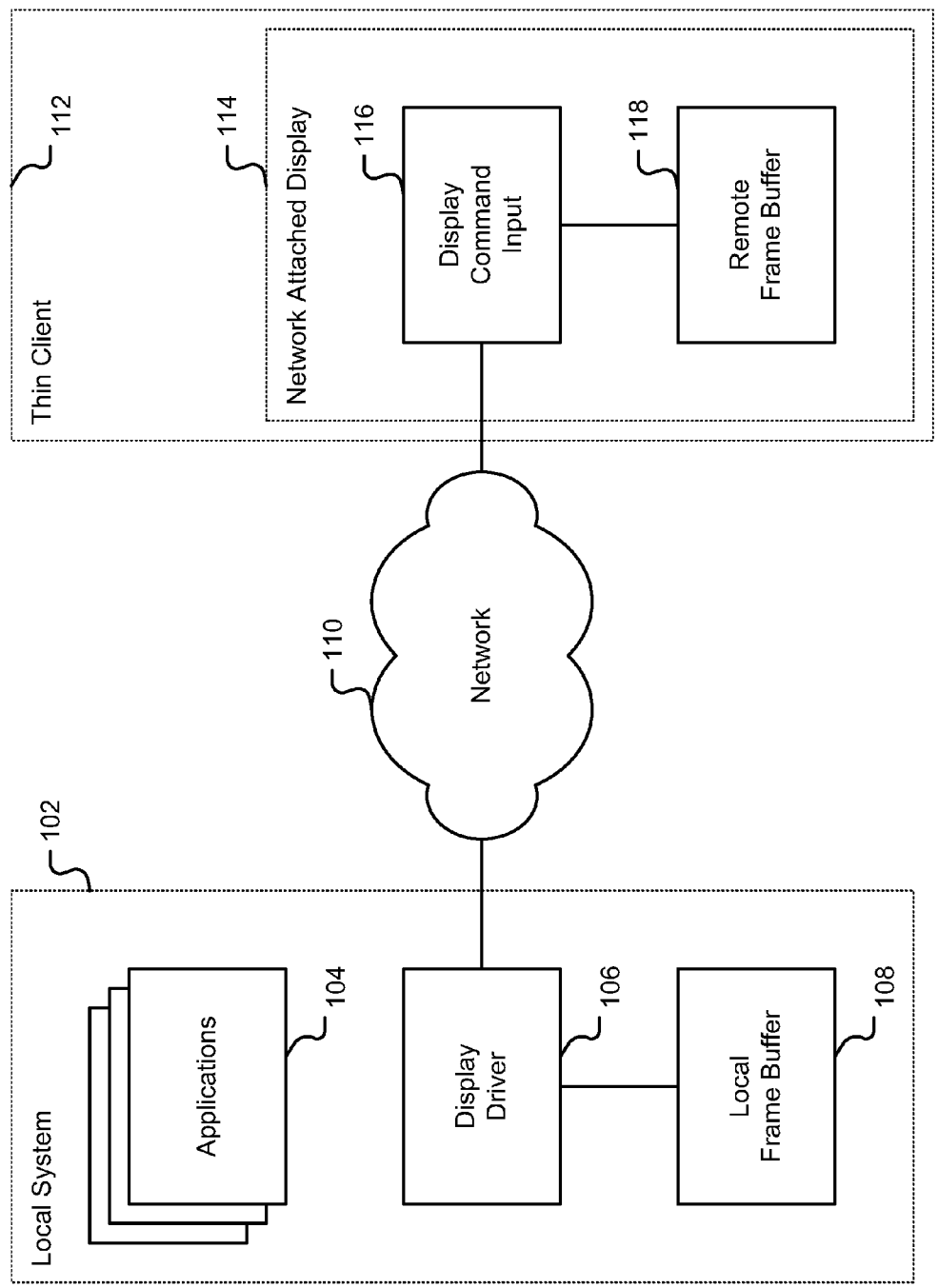
FIG. 1 is a block diagram illustrating an embodiment of a display driver operating a remote display device over a network.

FIG. 1 is a block diagram illustrating an embodiment of a display driver operating a remote display device over a network. Local system 102 is a host system for a thin client 112. Local system 102 comprises one or more applications 104, a display driver 106 and a local frame buffer 108. Local system 102 is connected across a network 110 to the thin client 112. Thin client 112 comprises a network attached display 114, which includes a display command input 116, which modifies a remote frame buffer 118.

The system shown in FIG. 1 contrasts a system wherein the video driver 106 and the display 114 are within the same physical computer chassis separated only by a local system bus, for example an Industry Standard Architecture ("ISA"), Extended ISA ("EISA"), Peripheral Component Interconnect ("PCI") or PCI Express bus. A local bus is distinguished from a digital network 110, wherein throughout this specification "network" refers to any interconnection between computer components external to the physical computer chassis including the Internet, Ethernet, intranet, local-area network ("LAN"), home-area network ("HAN"), wide-area network ("WAN"), Fibre Channel, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting heterogeneous systems and/or groups of systems together.

For a display driver 106 operating a remote display device over a network, the display driver is responsible for taking updates to the display and sending them across a network 110 to a network attached display 114. This may be done by keeping track of the regions in the local frame buffer 108 that have changed and sending them across the network 110 as soon as possible, as this process is often limited by the speed or performance of the network 110.

In some instances, the contents of the frame buffer 108 are not read until it is time to send that data across the network 110 to ensure that the most recent data is captured from the frame buffer 108. This is because in some circumstances it is not possible to keep up with all changes to the display 114, and in such a case, changes to the display 114 for overlapping regions therefore become combined. For example, if a blue circle is drawn on a screen followed by a red circle covering the blue circle, instead of sending both circles across the network 110, only the latter circle is sent thus saving bandwidth, allowing the display driver 106 to catch up.

Updates sent from the display driver 106 across the network 110 to the network attached display 114 are accepted by the display command input 116 block, which modifies the remote frame buffer 118 accordingly. Updates are sent in the form of commands that affect the remote frame buffer 118 according to the requirements of those commands. Commands include a bitmap command, which indicates that a particular sequence of pixels may be placed in the frame buffer 118, and a remote copy command, which indicates that a sequence of pixels may be copied from one region in the remote frame buffer 118 to another. The remote frame buffer 118 maintains an image of what is on the screen of the network attached display 114.

Figure 2:
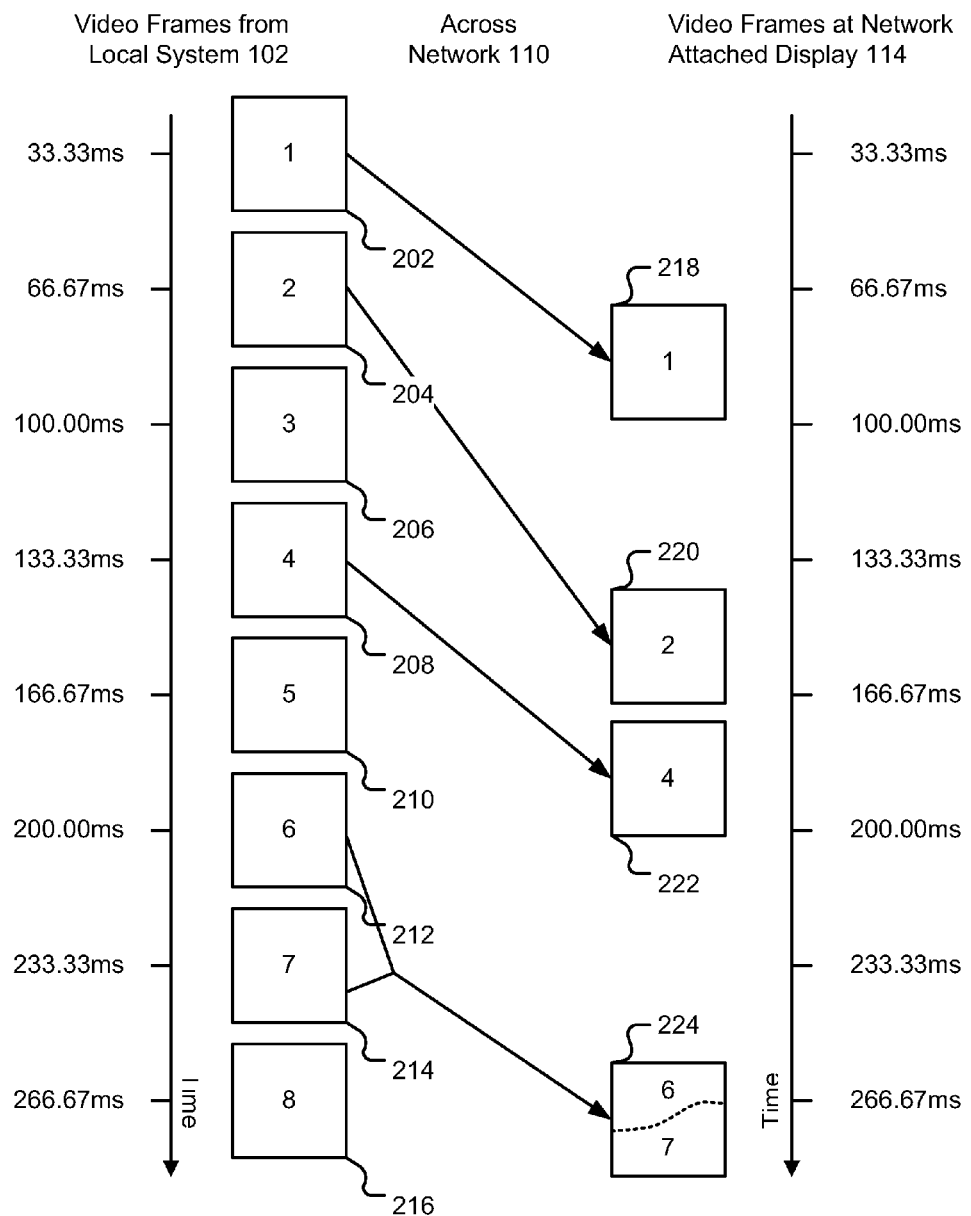
FIG. 2 is an illustration of examples of network performance degrading display quality.

FIG. 2 is an illustration of examples of network performance degrading display quality. In particular, it shows the lifecycle of video frames being generated from local system 102 as they traverse across network 110 to thin client 112 and its associated network attached display 114.

A video is being displayed on the screen of thin client 112; the video may either take up the full screen or a sub-section of the screen. Computer generated animations, such as 3D modeling or gaming have similar requirements as playing video. Without loss of generality, all such applications 102 that generate continuous updates to a region of the frame buffer are referred to throughout this specification as "video."

In the case of a 30 frame-per-second video, every 33.33 milliseconds for the duration of the video, a frame will be drawn into local frame buffer 102 from an application 104. It is the responsibility of display driver 106 to send these frames across network 110 to the remote frame buffer 118 of the remote display device. The display driver 106 will attempt to do this as fast as it can under the conditions of network 110. If the display driver 106 cannot keep up, the result will be a poor user experience for the user watching the remote display device.

Symptoms of a poor user experience include:
1) Missing frames: As with the example of the blue and red circle, if a frame cannot be sent onto the network in time it may be replaced with a newer frame. This is shown in FIG. 2 where "Frame 3" 206 on local system 102 has no equivalent frame delivered to the network attached display 114 and was dropped or delayed across network 110.
2) Irregular frame rate: An irregular frame rate may appear "jerky" to a user if a video is intended to be displayed at, for example, 30 fps, or 33.33 ms. Frames out of local frame buffer 108 may be copied out of the frame buffer at non-regular intervals due to local processor bandwidth and/or frames appearing on remote display 114 may be irregular due to network conditions. This is shown in FIG. 2 as is evident by the large time difference between the arrival of "Frame 1" 218 and "Frame 2" 220 into the remote frame buffer 118, and the short time difference between the arrival of "Frame 2" 220 and "Frame 4" 222.
3) Frame tearing: If the display driver 106 is copying a frame out of the frame buffer 108 slowly because of CPU performance of local system 102 and/or because network 110 is slow, then it is likely that it will copy a portion out of one frame and a portion out of a subsequent frame.
   This is known as "tearing" and appears on the screen as one or more horizontal lines in the frame separating regions of the frame on the remote display 114 that came from different frames in the local frame buffer 108. This is shown in FIG. 2 where half of "Frame 6" 212 and half of "Frame 7" 214 in the local frame buffer 108 become combined in the remote frame buffer 118 as "Frame 6/7" 224.

Methods taken to improve a user's experience when dealing with videos or other rapidly changing regions of the display are disclosed.

Figure 3:
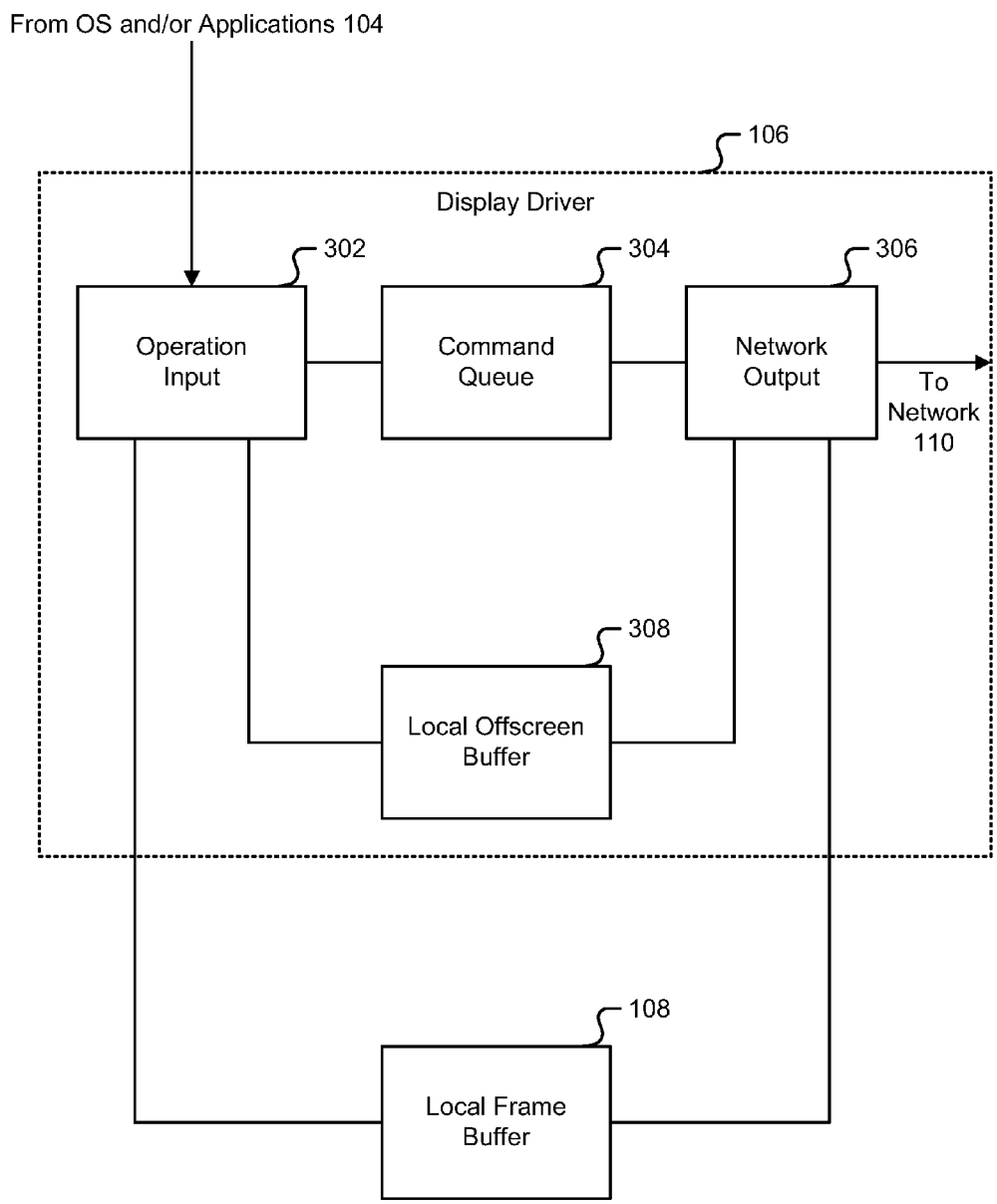
FIG. 3 is a block diagram illustrating an embodiment of a display driver and its comprised components operating a remote display device over a network.

FIG. 3 is a block diagram illustrating an embodiment of a display driver and its comprised components operating a remote display device over a network. A display driver 106 operating over a network 110 receives a series of drawing operations from the operating system and/or applications 104, processes those operations, and then sends them over the network 110 to a network attached display 114. In the example shown, display driver 106 comprises an operation input processor 302, a command queue 304, a network output processor 306 and a local offscreen buffer 308.

A large set of possible drawing operations may be received by operation input processor 302. This processor 302 will translate the operation into a command that can be processed by the network attached display 114. This may be useful because the set of possible drawing operations from the OS and/or applications 104 may be larger than the set of commands that can be accepted by the network attached display 114.

For example, consider a network attached display 114 that can only accept two commands:
1) fillRect—draw a rectangle on the screen at a specified location with specified dimensions a specified color; and
2) bitmap—draw a specified bitmap on the screen at a specified location.

For such a system, drawing operations that can be translated into an equivalent fillRect, for example, "draw rectangle", "draw horizontal line", "draw vertical line", will have fillRect commands enqueued into command queue 304 subsequent to those operations being rendered into the local frame buffer 108.

All other drawing operations may be translated into a bitmap command. After the operation input processor 302 renders an operation into the local frame buffer 108, it enqueues a bitmap command into command queue 304 with the coordinates and dimensions in the local frame buffer 108 where the drawing operation occurred. When that bitmap command reaches the front of command queue 304, the network output processor 306 will copy and optionally compress the pixels for the referenced region out of the frame buffer 108 and send that bitmap to the network attached display for processing.

In this example, the bitmap command pointed to a region in the local frame buffer 108 where the bitmap pixels were stored. An advantage of this is that the most recent updates to the frame buffer 108 are always sent onto network 110 in the case that subsequent operations have drawn to the frame buffer 108; this case reduces network bandwidth by always sending only the most recent update instead of sending intermediate updates to the screen 114. However, doing this may also have negative side-effects such as frame tearing in the case of video; where a new video frame is being drawn to the frame buffer 108 at the same time as the network output processor 306 is reading those same pixel out of the frame buffer 108 and ends up reading a portion of one frame and portion of the subsequent frame.

A procedure to reduce tearing is to utilize a local offscreen buffer 308, including:
1) Operation input processor 302 receives a drawing operation from the operating system and/or application 104 that it determines will be translated into a bitmap command;
2) Operation input processor 302 renders the drawing operation to the frame buffer 108;
3) Operation input processor 302 copies the rendered pixels from the frame buffer 108 to a local off screen buffer 308 that is capable of storing a plurality of bitmaps;
4) Operation input processor 302 enqueues a bitmap command pointing at the copied bitmap in the local off screen buffer 308 into command queue 304; and
5) When the bitmap command reaches the front of the command queue 304, the network output processor 306 copies and optionally compresses the bitmap from the local off screen buffer 308 and sends it over the network 110 to the network attached display 114.

Thus, bitmap commands that reference the local frame buffer 108 will be referred to as "bitmap dirty" commands. bitmap commands that reference the local off screen buffer 308 will be referred to as "bitmap copy" commands.

Methods to preserve the user experience of video and other rapidly changing portions of the screen are disclosed. Three objectives for a display driver operating over a network include:
Objective 1. Ensure that full video frames are taken out of the frame buffer at a time, to ensure there is no frame tearing;
Objective 2. Manage the frame rate to ensure that the rate at which frames are sent are regular and not choppy; and
Objective 3. Ensure that as frames appear on the network attached display, they appear all at once rather than drawn slowly or perceptible to the user.

Prior to achieving these objectives, the display driver 106 may first detect video. Often, video is drawn to the screen by simply copying a series of bitmaps to the frame buffer using an display driver operation called a blt. Without loss of generality, a "blt" throughout this specification is defined as any operation copying a bitmap representing part or all of a frame from an off-screen bitmap to an on screen area of the screen. Because blts are used for more than just video, it is important for the display driver to distinguish video from non-video.

The case of video and the case of a rapidly changing region of the screen, such as an animation, are very similar in their usage of the screen and as such can be treated very similarly, both as video. The major difference between the two cases is that the former has a very regular frame rate, such as 30 fps, and the latter sometimes has an irregular frame rate. Throughout this specification these two cases are referred to respectively as "regular video" and "irregular video".

Figure 4:
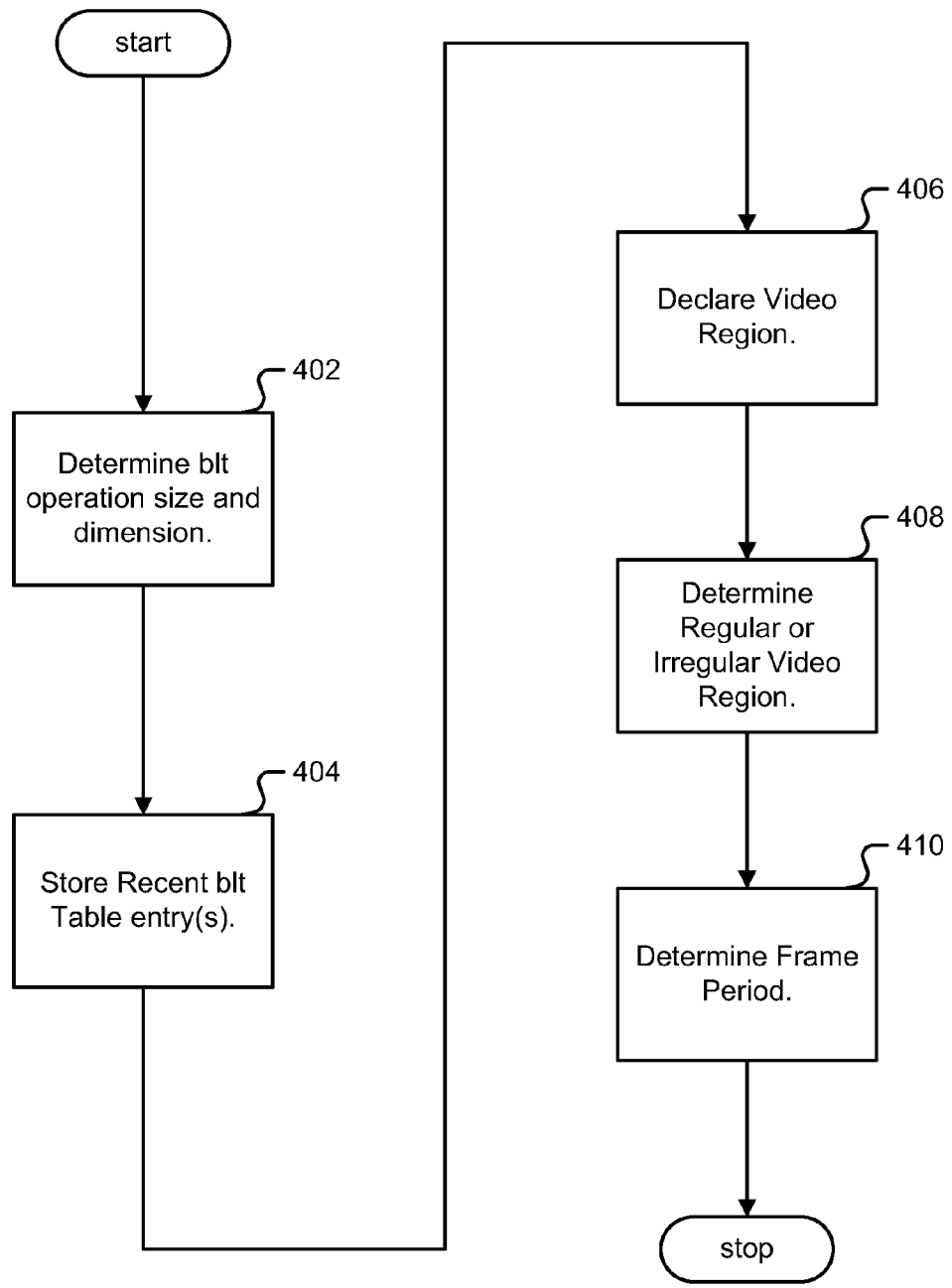
FIG. 4 is a flowchart illustrating an embodiment of a determination of video to reduce frame tearing.

FIG. 4 is a flowchart illustrating an embodiment of a determination of video to reduce frame tearing. The process of FIG. 4 may be implemented on local system 102 and/or display driver 106. Driver 106 may use one or more rules, in some embodiments implemented by the operation input processor 302, to determine if and where a video is being played as well as the characteristics of that video. The rules may be omitted or executed in alternate order without loss of generality.

In step 402, each time the display driver 106 receives a request for a blt operation, the size of that operation is compared against a video threshold. The precise size of this threshold may vary for an embodiment. One possible rule is checking that the total number of pixels, width multiplied by height, of the blt exceeds a minimum threshold. Another rule may enforce that the aspect ratio, ratio of width to height, is within a certain range, or that either the width or height are within a certain range. As an example, it may simply check that both the height and the width are greater or equal to 100 pixels. Any blt operations that do not meet this example criteria are excluded further processing to determine if and where a video is being played.

In step 404, if a blt operation matches the criteria in step 402, an entry is made in a data structure, for example a recent blt table, with the coordinates, width, height, and time stamp of the operation. The recent blt table data structure is designed to ingest a large number of these operations per second and quickly lookup operations by coordinate, and also designed such that operations with old time stamps, such as more than N milliseconds old, can be easily and efficiently removed. An example of such a data structure is a hash to store the entries and a queue to keep track of which operations have aged after N=1000 milliseconds, or 1 second.

In step 406, at the time of a blt operation, the recent blt table of step 404 may be consulted to see if any other blt operations have been made to the same coordinate within the last M milliseconds, or other pre-determined interval of time. If within the interval other blt operations found at the same coordinates are of similar size, and the number of such blts exceeds a minimum threshold, then the region defined by the coordinates and dimensions is declared to be a video region. The minimum threshold selected will vary. For example, one embodiment would select a minimum threshold of 5 blts for M=1000 milliseconds or 1 second, meaning that videos with less than 5 frames per second would not be declared a video region.

In step 408, the timestamps of the blt operations to the video region are compared to one another to determine if it is a regular video or an irregular video. This can be done by taking the set of time deltas between adjacent blt operations, and calculating the ratio of the largest delta to the smallest delta. This ratio is then compared against a pre-determined threshold to determine whether the video region comprises a regular video or an irregular video.

For example, if the time stamps of the blt ops were (10, 20, 31, 40, 50), then the time deltas between adjacent frames would be (10,11,9,10). The largest delta is 11, and the smallest delta is 9. Hence, the ratio between the two is 11:9, or 1.22. If the pre-determined threshold is 1.33, then comparing 1.22 against 1.33 would indicate that this is a regular video. An irregular video in this example would be one with a ratio greater than 1.33. The value of the pre-determined threshold will vary with the embodiment, and will depend on the expected accuracy of video playback into the local frame buffer 106.

A more complex rule may calculate the mean and standard deviation of the deltas and exclude outliers before calculating the ratio. Another more advanced algorithm is to bin the deltas using a histogram and compare the ratio in frequency of the ultimate bin to the frequency of the penultimate bin to a pre-determined threshold. The determination of a regular video versus an irregular video is ongoing with each new frame. As additional frames are added, this analysis may be repeated to determine if the video continues to be regular or irregular.

In step 410, once a region is determined to be a video, the retention age of blt operations in the recent blt table may be extended. In some embodiments it is reasonable that blt operations for non-video regions only be kept in the recent blt table for a short while, for example 1 second, but once a region is determined to be a video region it is useful to maintain a longer history. For example, if non-video regions are kept for 1 second, blt operations for a video region may be retained for a longer period of time such as 5 or 10 seconds. For regular video, this history of blt operations may be analyzed to determine the frame period, which is the average amount of time between blt operations. The frame period can be calculated by simply calculating the mean of all the deltas between adjacent blt operations. A more complex algorithm may calculate the mean and standard deviation of deltas and exclude outliers. Another advanced algorithm may maintain a moving average of deltas and exclude outliers by comparing the ratio of each new delta to the moving average to determine if it may be included.

This method may be used by video driver 106 to detect when a video is being played and determine its coordinates, its frame period, and if it is regular or it is irregular video. In addition to the frame period, called throughout this specification as a "measured frame period", the measured frame rate can also be calculated by inversing the frame period. For example, a measured frame period of 33.33 ms would correspond to a 1/33.33 ms measured frame rate, which is 30 frames per second ("fps".)

There are different algorithms for taking a moving average. One example is:

$$MovingAverage_n = (1-\alpha) \times MovingAverage_{n-1} + \alpha \times Sample_n$$

Where $\alpha$ is between 0 and 1, and represents the weight of the new sample relative to older samples. The larger $\alpha$, the quicker the moving average will track changes in the sample measurements. The following table shows the number of samples it takes for the moving average to achieve 80% of the value of a sample change, for a step function, for various values of $\alpha$:

| $\alpha$ | Samples |
| --- | --- |
| 0.01 | 161 |
| 0.016 | 100 |
| 0.02 | 80 |
| 0.05 | 32 |
| 0.10 | 16 |
| 0.15 | 10 |
| 0.20 | 8 |
| 0.30 | 5 |
| 0.40 | 4 |
| 0.50 | 3 |
| 0.60 | 2 |
| 0.80 | 1 |

Thus, if the moving average is to track within 1 second for a 30 fps video, then an a value of approximately 0.05 may be selected as this will track to 80% within 32 frames, which is 1.07 seconds.

In some embodiments, once the display driver 106 detects a video, all blt operations associated with that video are translated into bitmap copy commands by the input operation processor 302 to fulfill Objective 1 and prevent frame tearing. In addition to using bitmap copy commands, the input operation processor 302 may mark each bitmap copy command with a flag indicating that this is part of a video, also indicating if it is regular video or irregular video, and with the timestamp of the blt operation that resulted in the bitmap copy command. This flag is necessary in case the network output processor 306 gives special treatment to video.

Figure 5:
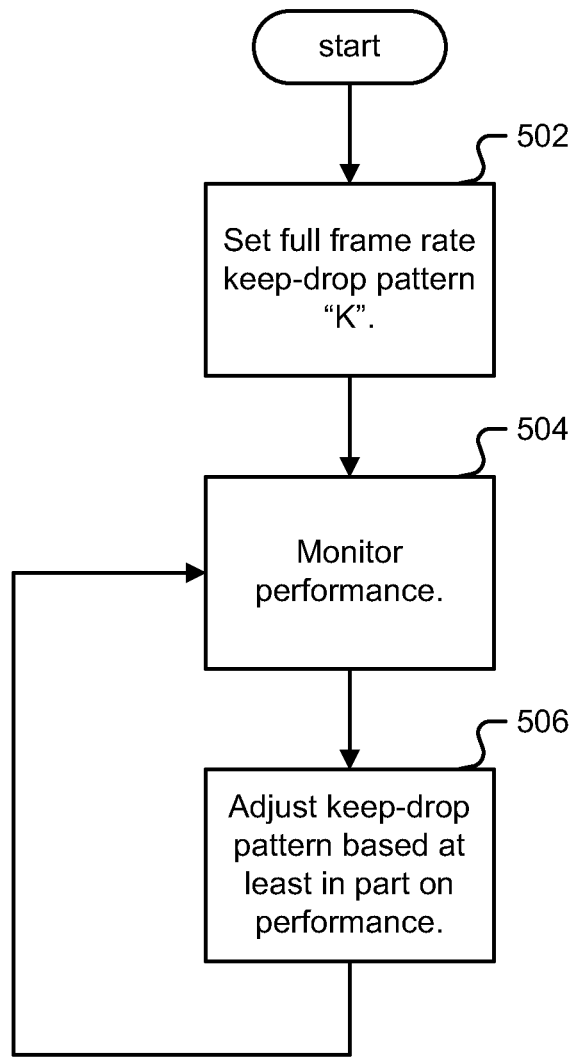
FIG. 5 is a flowchart illustrating an embodiment of managing frame rate for regular video.

FIG. 5 is a flowchart illustrating an embodiment of managing frame rate for regular video. The process of FIG. 5 may be implemented on local system 102 and/or display driver 106. The objective is to manage the frame rate to ensure that the period at which frames are sent are regular and not choppy for the case of regular video. Irregular video may be managed differently as it has an irregular frame period.

In the case of a regular video with a frame arriving at a fixed period, the frame period, the ideal scenario is that for each frame, the associated blt operation is converted to a bitmap copy command, and that command is sent to the network attached display. However, a number of conditions may not permit all of this to occur within the time allotted. Specifically, the amount of available network bandwidth, or the performance of the system and/or CPU running the display driver may limit the number of bitmap copy commands that may be generated, processed, and transmitted per second. If this limit is smaller than the rate of frames per second, then the system will fall behind and frames will be dropped. When frames are dropped in this fashion, they are dropped in an irregular way, and the resulting frame period is irregular.

Frames dropped in this fashion correlate with a negative user experience perception. Thus, if the system cannot handle full frame rate and frames may be dropped, the system can instead elect to drop frames intentionally using a drop pattern such that the resulting frame rate is also regular. For example, the following patterns may be used for 30 fps video with a resultant drop in frame rate:

Keep every 2nd frame: 30 fps→15 fps;
Keep every 3rd frame: 30 fps→10 fps;
Keep every 4th frame: 30 fps→7.5 fps; and/or
Keep every 5th frame: 30 fps→6 fps, Wherein "30 fps→7.5 fps" means 60 frames per 2 seconds become 15 frames per 2 seconds.

These drop patterns, called keep-drop patterns, can be expressed as a series of K and D letters, where K indicates a frame that is not dropped ("a keep") and D indicates a frame that is dropped ("a drop") for a series of frames, wherein the pattern repeats. For example, a "keep every 2nd frame pattern" is expressed as KD, and a keep every 5th frame is expressed as "KDDDD".

Likewise, considering a 24 fps video:
Keep every 2nd frame (KD): 24 fps→12 fps
Keep every 3rd frame (KDD): 24 fps→8 fps
Keep every 4th frame (KDDD): 24 fps→6 fps
Keep every 5th frame (KDDDD): 24 fps→4.8 fps In some cases it may also be desirable to allow for a non-regular frame period. The purpose of maintaining a regular frame period is such that a user watching the video at the network attached display is satisfied with the quality of the video. An irregular frame period will result in choppy looking video.

However, in some instances there are non-regular patterns that will result in video that is not perceived as choppy when the frame rate is high enough. For example, in some embodiments if the resulting frame rate is at least 20 frames per second, other patterns may also be perceived by users as acceptable including KKD and KDKDK.

Thus, based on the measured frame rate, the set of applicable patterns can be determined and sorted in descending order of resulting frame rate. For example, video with a measured frame rate of 30 fps would be eligible to use any of the following patterns in sorted order:

K (30 fps)
KKKKD*(24 fps)
KKKD*(22.5 fps)
KKD*(20 fps)
KD (15 fps)
KDD (10 fps)
KDDD (7.5 fps)
KDDDD (6 fps)

Wherein the keep-drop patterns denoted with an asterisks (*) are those patterns that will result in a non-regular frame period and may be used if the resulting frame rate is at least a threshold, say 20 fps.

In step 502, the display driver will initially select the full frame rate keep-drop pattern "K", and in step 504 monitors performance to determine if changes are required in step 506. Each time the network output processor 306 processes a bitmap copy command associated with a video frame, it measures the total time required to process that command. The measurement may begin when the command is removed from the command queue 304 and end once the final byte of data associated with that command has been sent on the network 110. This measurement is called the "frame processing time".

In addition, each time the frame processing time is measured, it may be used to update a moving average of frame processing times, called the "average frame processing time". The average frame processing time may be used to calculate a maximum frame rate as follows for each video that is detected:

MaximumFrameRate=β/AverageFrameProcessingTime

Where β is a number between 0 and 1. This formula inverses the average frame processing time to calculate a frame rate. This is the maximum frame rate that can be supported given measured performance.

It may not be advisable that the system be run at 100% capacity, since the resources are shared with a variety of other tasks. Hence, the factor β is multiplied in to allow the calculated maximum frame rate to be less than this maximum supported rate by this factor. For example, a factor of 0.7 may leave 30% of the capacity for other tasks, where a measured average frame period of 70 ms would result in a 10 fps Maximum Frame Rate with that selected β.

In addition, the MaximumFramePeriod can be calculated by inversing MaximumFrameRate:

MaximumFramePeriod=1/MaximumFrameRate.

Figure 6:
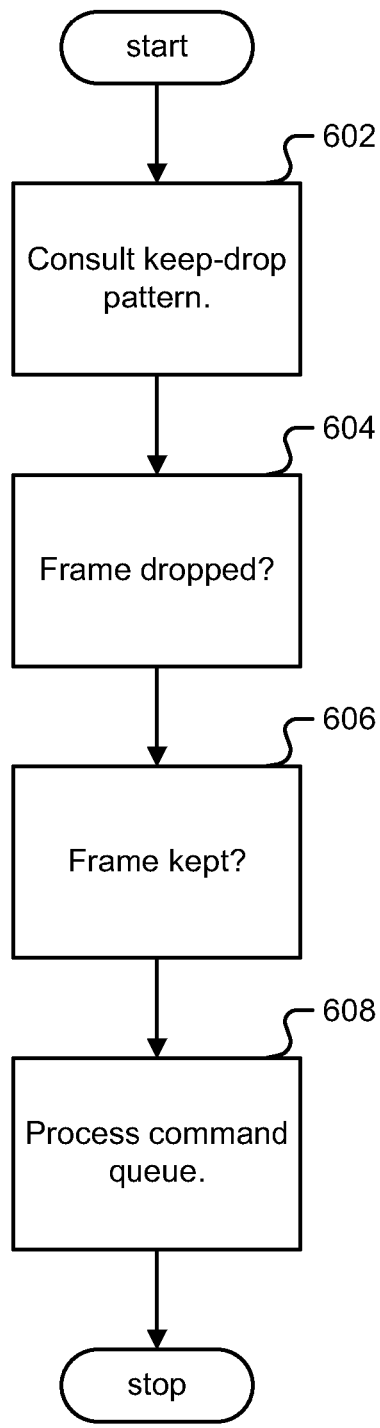
FIG. 6 is a flowchart illustrating an embodiment of intentionally dropping frames.

FIG. 6 is a flowchart illustrating an embodiment of intentionally dropping frames. The process of FIG. 6 may be implemented in step 506 of FIG. 5. The objective is to manage intentionally dropping frames carefully to ensure display coherency. A procedure such as the following may be used for regular video:

In step 602, each time the operation input processor 302 receives a blt operation associated with a video, it consults the keep-drop pattern in effect to determine if that frame is to be kept or dropped. The operation input processor 302 may maintain a data structure to store the position in the keep-drop pattern for each video in progress. For example, there may be two videos being played at the same time, one with a KD pattern, and the other with a KDD pattern; the input processor 302 will have to maintain a data structure to keep track of where in each of patterns each of the two videos is.

In step 604, if the frame is to be dropped, then a bitmap dirty command may be enqueued in the command queue 304, flagged as part of a video, and flagged with an expiry period of MaximumFramePeriod of the video the command is associated with.

In step 606, if the frame is to be kept, then a bitmap copy command may be enqueued in the command queue 304, and flagged as part of a video. If at the time the bitmap copy command is being enqueued, there exists an older bitmap copy command in that same queue for the same video, then that older bitmap copy command may be forcibly dropped by removing it and in its place inserting the new bitmap copy command.

That is, the new command may assume the position in the queue of the older command, and the older command may be removed. One possible exception to this is if there are other commands in the command queue 304 that overlap the region covered by the bitmap copy command in between the old and the new command, in which case the new command may be enqueued as normal.

The behavior described in step 606 allows the operation input processor 302 to detect when the network output processor 306 is not able to keep up with frames, and respond by forcibly removing a frame in the queue. The new frame is placed in the position of the old frame to impel forward progress. Had the new frame been placed at the end of the queue, there exists the risk that no frames will make it to the front of the queue if this forcible dropping occurs continuously.

In step 608, the network output processor 306 processes commands in the command queue 304 normally with the exception of bitmap dirty commands that have been flagged as a video and flagged with an expiry period, which are called "delayed bitmap dirty commands". Those commands may be given special treatment.

Figure 7:
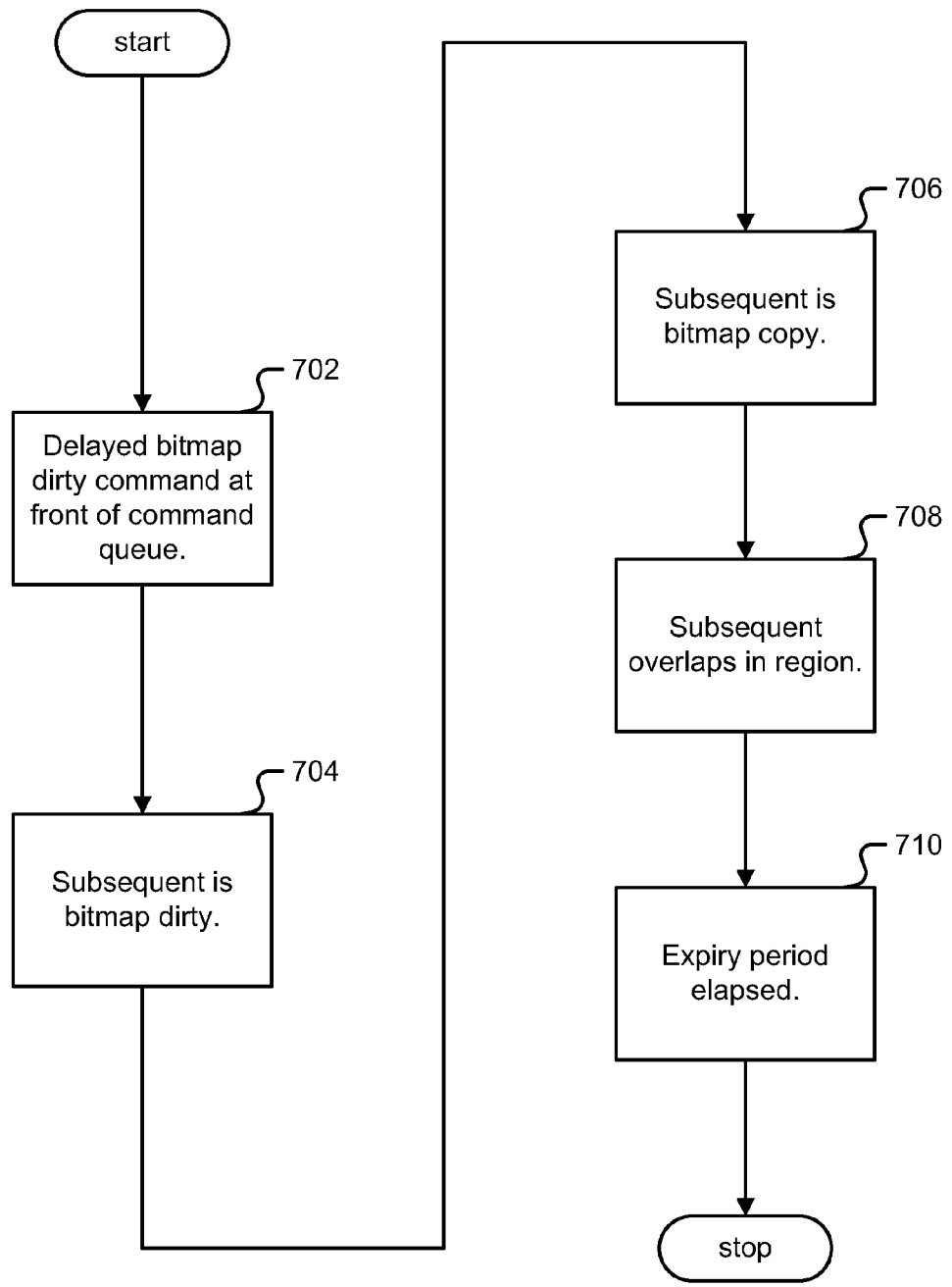
FIG. 7 is a flowchart illustrating an embodiment of processing delayed bitmap dirty commands.

FIG. 7 is a flowchart illustrating an embodiment of processing delayed bitmap dirty commands. The process of FIG. 7 may be implemented in step 608 of FIG. 6. One or more steps of FIG. 7 are intended to ensure bitmaps sent to the network attached display 114 are accurate, and that the final frame of a video is not discarded.

In step 702, when a delayed bitmap dirty command reaches the front of the of the command queue 304, meaning it is ready to be processed, it may not be removed or processed until its expiry period has elapsed. It may instead be skipped such that subsequent commands in the queue are processed. The expiry period is considered to have elapsed when the amount of time defined by the expiry period has elapsed since the time stamp associated with the command. For example, if a bitmap dirty command resulted from a blt operation that occurred at time X, and the expiry period flagged with the command is Y, then the expiry period is considered to have elapsed at time X+Y.

In step 704, if when processing subsequent commands, a subsequent command is found that is another bitmap dirty command for the same video, then the command in question may be discarded, removed from the queue, and not processed. The subsequent bitmap dirty command may be treated with all of these same rules, and may move to the front of the queue but may not be processed as described in step 608.

In step 706, if when processing subsequent commands, a subsequent command is found that is a bitmap copy command for the same video, then the command in question may be discarded, removed from the queue, and not processed. The subsequent bitmap copy command may be processed immediately.

In step 708, if when processing subsequent commands, a subsequent command is found that overlaps in region with the command in question, then both commands may be removed from the queue and processed.

In step 710, when the expiry period for the bitmap dirty command in question has elapsed, then the network output processor 306 may search the command queue 304 for any bitmap copy commands for the same video. If no such commands are found, then the bitmap dirty command may be removed and processed. If such a command is found, then the bitmap dirty command may be removed, discarded and not processed.

Figure 8:
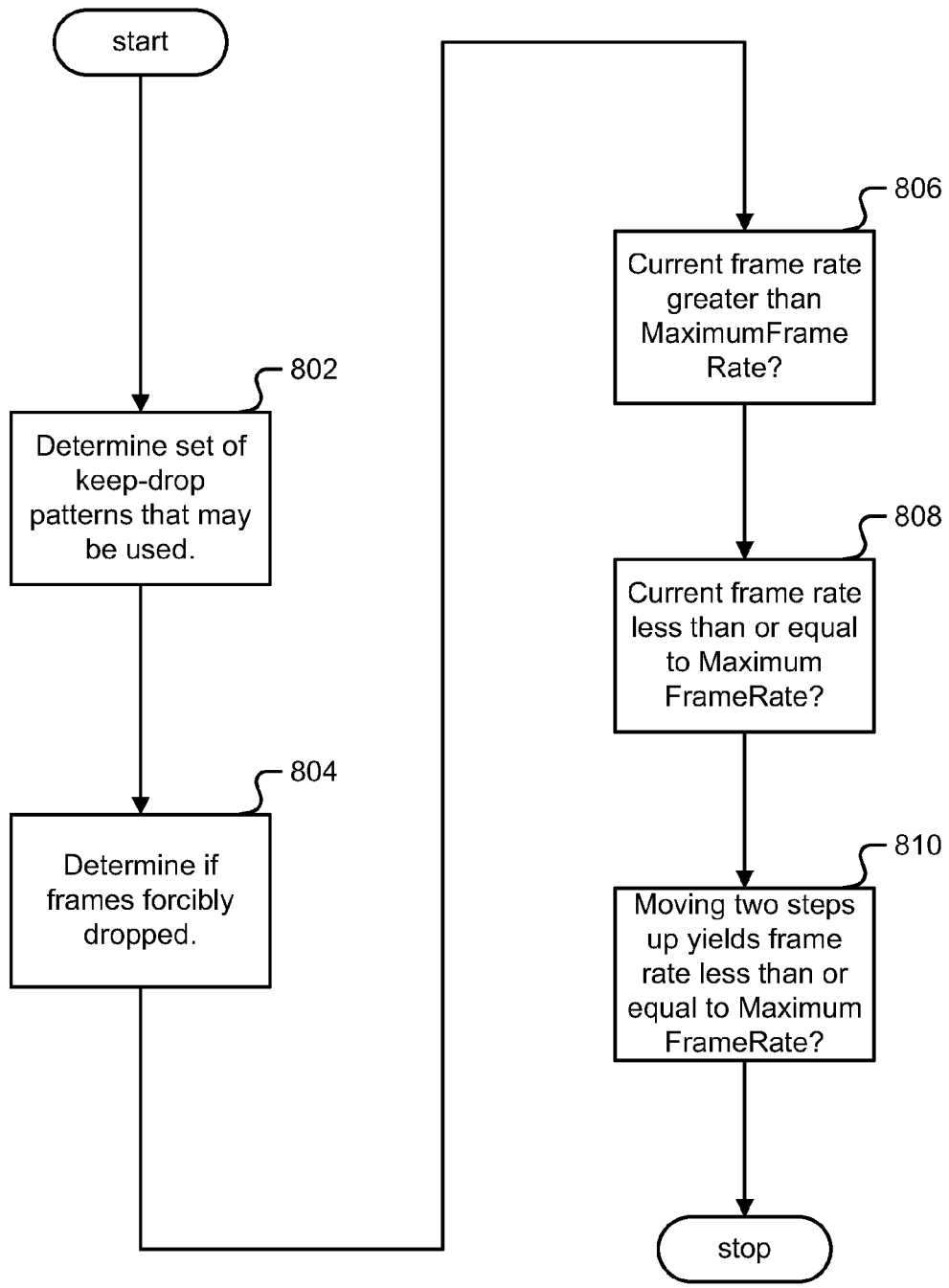
FIG. 8 is a flowchart illustrating an embodiment of reducing frame rates.

FIG. 8 is a flowchart illustrating an embodiment of reducing frame rates. The process of FIG. 8 may be implemented in step 606 of FIG. 6. One or more steps of FIG. 8 are intended to ensure frame rates are reduced using rules when a frame is forcibly dropped as described in Step 606 for regular video. In this situation the network output processor 306 cannot keep up with the frame rate, either due to a slow network or due to a shortage of CPU and/or processing time. As such, the frame rate may be reduced using the following rules or steps.

In step 802, the video driver is constantly calculating the measured frame rate, and from that calculates the set of keep-drop patterns that may be used. Initially, the full frame rate is selected, and as such the K pattern is selected.

In step 804, if a series of frames are forcibly dropped, the video driver 106 will reduce the selected frame rate by choosing a new keep-drop pattern. It is not necessary to reduce the selected frame rate as soon as a single frame is forcibly dropped, as this drop might have been cause by a transient condition.

The criteria to decide when to reduce the frame rate will vary for each embodiment. In one embodiment, the frame rate is reduced if the ratio of forcibly dropped frames to successfully sent frames exceeds a certain threshold such as 0.25, meaning that more than one frame is dropped for every four that are sent, as measured over a three second period. In one embodiment, a cumulative total of forcibly dropped frames is recorded since the last time the frame rate was adjusted, and the decision to reduce the frame rate occurs when this cumulative total reaches a pre-defined threshold.

In step 806, when the video driver 106 decides to reduce the selected frame rate, then if the currently selected frame rate is greater than the MaximumFrameRate measured by the video driver, then the video driver 106 may select the keep-drop pattern that will yield the highest frame rate less than or equal to the MaximumFrameRate.

In step 808, when the video drive 106 decides to reduce the selected frame rate, then if the currently selected frame rate is less than or equal to the MaximumFrameRate, then the video driver may select the keep-drop pattern that will yield the highest frame rate less than the currently selected frame rate. That is, the video driver 106 may move to the next pattern in the set slower than the one currently selected, called "moving one step down".

In step 810, if at any time the display driver finds that moving two steps up would yield a frame rate less than or equal to the MaximumFrameRate, then it may move one step up by selecting the keep-drop pattern associated with the next fastest frame rate, where "moving one step up" is the opposite of moving one step down.

Figure 9:
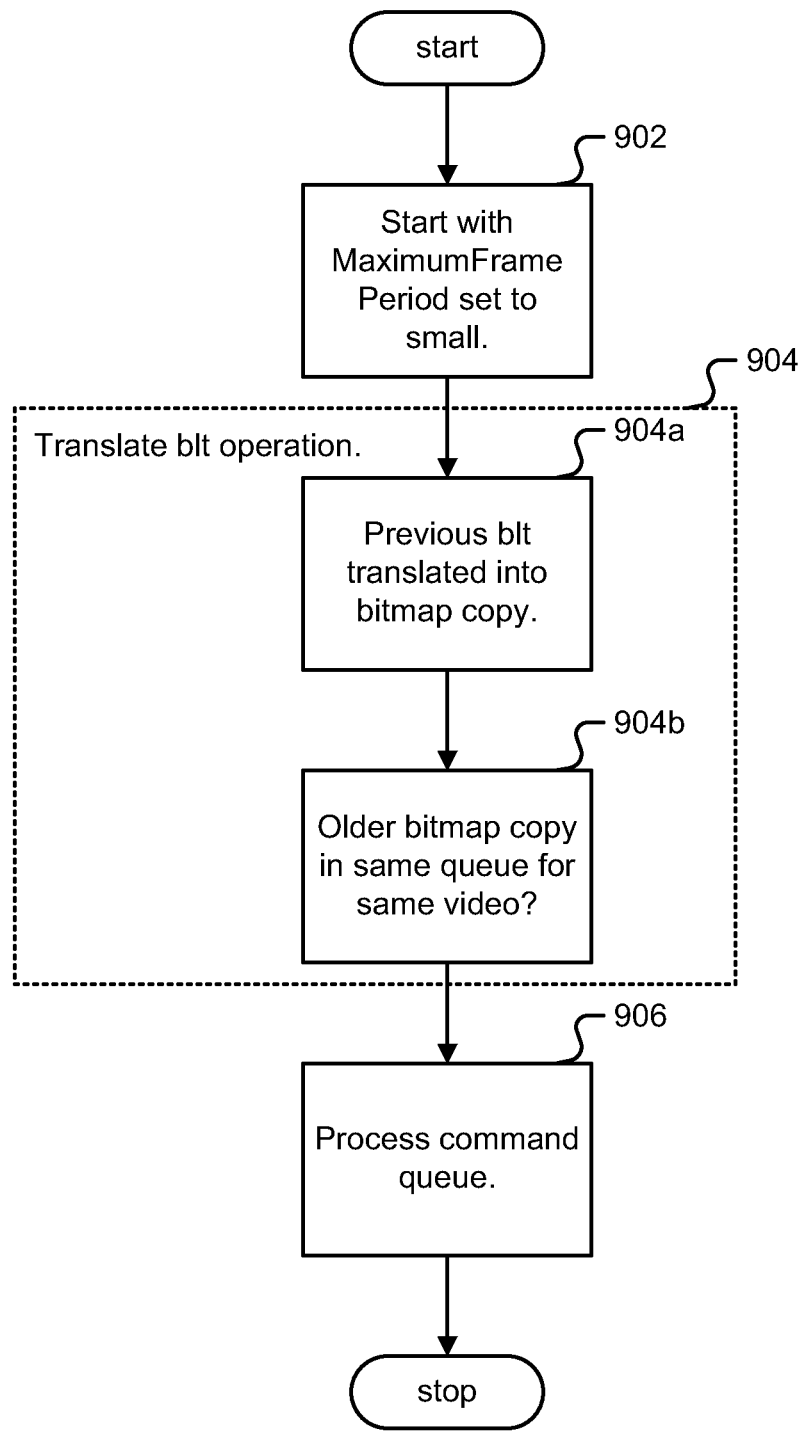
FIG. 9 is a flowchart illustrating an embodiment of managing frame rate for irregular video.

FIG. 9 is a flowchart illustrating an embodiment of managing frame rate for irregular video. The process of FIG. 9 may be implemented on local system 102 and/or display driver 106. For the case of irregular video, the intentional dropping of frames may be handled carefully to ensure display coherency. A procedure including one or more of the steps in FIG. 9 may be used for irregular video.

In step 902, the video driver 106 starts with a MaximumFramePeriod set to a small value. In some embodiments the value may be 10 ms. From that point further, the MaximumFramePeriod will be updated each time a frame is processed by the network output processor 306.

In step 904, when the operation input processor 302 receives a blt operation associated with a video, it will translate it to a bitmap copy command and enqueue it into the command queue 304, unless:

In step 904*a*, a previous blt operation within the MaximumFramePeriod timeframe has been translated into a bitmap copy command, in which case the blt operation may be translated into a bitmap dirty command instead. That is, a operation input processor 302 receiving a sequence of blt operations may translate those operations into bitmap copy commands every MaximumFramePeriod seconds, with all intermediate operations being translated to bitmap dirty commands. Bitmap dirty commands are flagged as part of a video, and flagged with an expiry period of MaximumFramePeriod of the video the command is associated with.

In step 904*b*, if at the time the bitmap copy command is being enqueued, there exists an older bitmap copy command in that same queue for the same video, then that older bitmap copy command may be forcibly dropped by removing it and in its place inserting the new bitmap copy command. That is, the new command may assume the position of the older command, and the older command may be removed. The exception to this is if there are other commands in the command queue 304 that overlap the region covered by the bitmap copy command in between the old and the new command, in which case the new command may be enqueued as normal. The behavior described in this step allows the operation input processor 302 to detect when the network output processor 306 is not able to keep up with frames, and responds by forcibly removing a frame in the queue. The new frame is placed in the position of the old frame to guarantee forward progress. Had the new frame been placed at the end of the queue, there exists the risk that no frames will make it to the front of the queue if this forcible dropping occurs continuously.

In step 906, the network output processor 306 is to process commands in the command queue 304 normally with the exception of bitmap dirty commands that have been flagged as a video and flagged with an expiry period, the delayed bitmap dirty commands. Those commands may be given special treatment.

Figure 10:
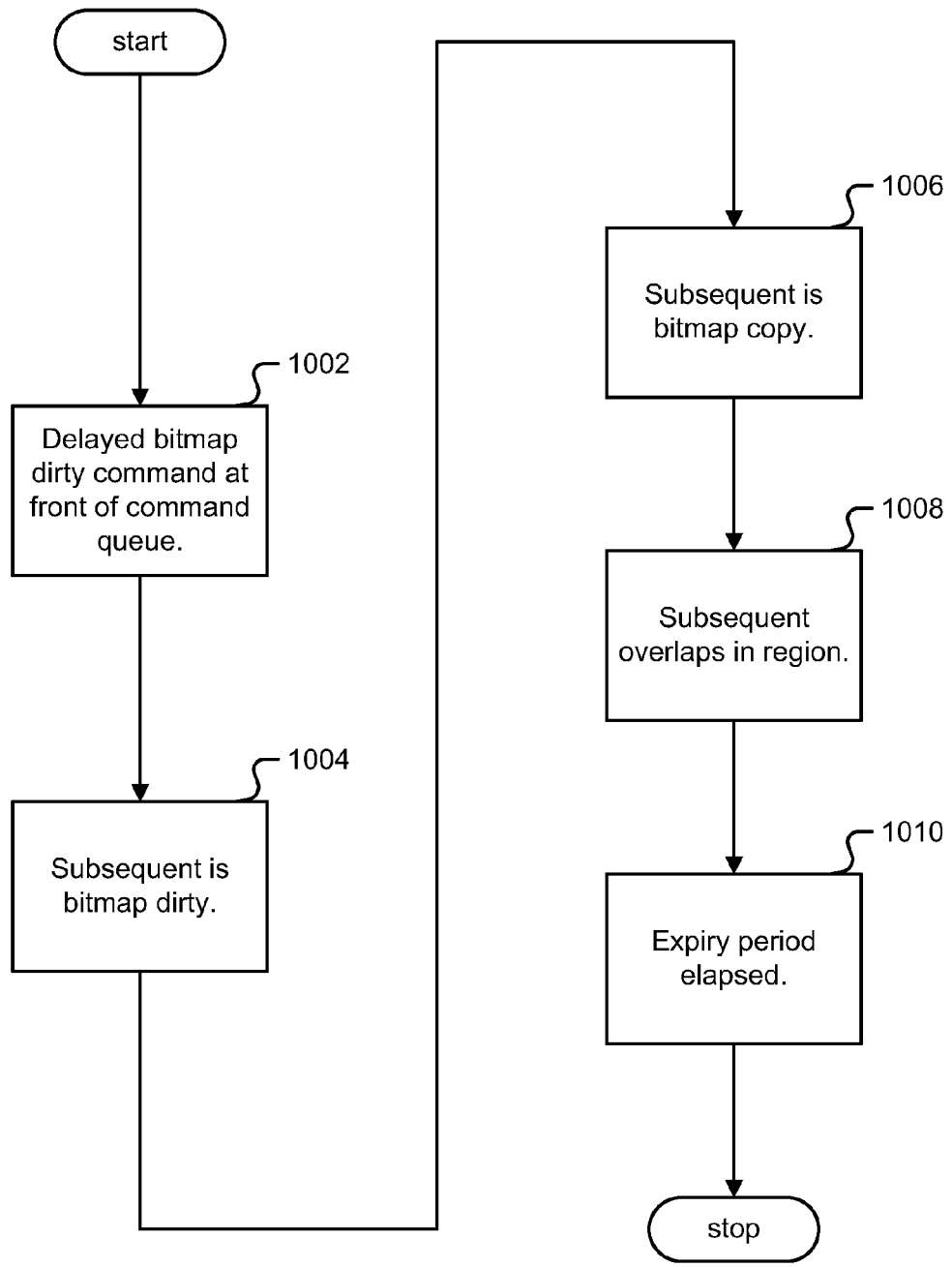
FIG. 10 is a flowchart illustrating an embodiment of processing delayed bitmap dirty commands for irregular video.

FIG. 10 is a flowchart illustrating an embodiment of processing delayed bitmap dirty commands for irregular video. The process of FIG. 10 may be implemented in step 906 of FIG. 9.

In step 1002, when a delayed bitmap dirty command in question reaches the front of the of the command queue 304, meaning it is ready to be processed, it may not be removed or processed until its expiry period has elapsed. Instead, it may be skipped such that subsequent commands in the queue are processed. The expiry period is considered to have elapsed when the amount of time defined by the expiry period has elapsed since the time stamp associated with the command. For example, if bitmap dirty command resulted from blt operation that occurred at time X, and the expiry period flagged with the command is Y, then the expiry period is considered to have elapsed at time X+Y.

In step 1004, if when processing subsequent commands, a subsequent command is found that is another bitmap dirty command for the same video, then the command in question is to be discarded, removed from the queue, and not processed. The subsequent bitmap dirty command may be treated with all of these same rules, as so it will move to the front of the queue but will not be processed.

In step 1006, if when processing subsequent commands, a subsequent command is found that is a bitmap copy command for the same video, then the command in question is to be discarded, removed from the queue, and not processed. The subsequent bitmap copy command may be processed immediately.

In step 1008, if when processing subsequent commands, a subsequent command is found that overlaps in region with the command in question, then both commands may be removed from the queue and processed.

In step 1010, when the expiry period for the bitmap dirty command in question has elapsed, then the network output processor 306 may search the command queue 304 for any bitmap copy commands for the same video. If no such commands are found, then the bitmap dirty command may be removed and processed. If such a command is found, then the bitmap dirty command may be removed, discarded and not processed.

These steps and/or rules attempt to ensure that the bitmaps sent to the network attached display 114 are accurate, and that the final frame of a video is not discarded. The rules for irregular video are similar to those for regular video, except that there is no keep-drop pattern. Instead, intentional drops are done in such a way as to maintain a frame period equal to MaximumFramePeriod, and the rules may rely more heavily on forcibly dropped frames than do the rules for regular video.

Figure 11:
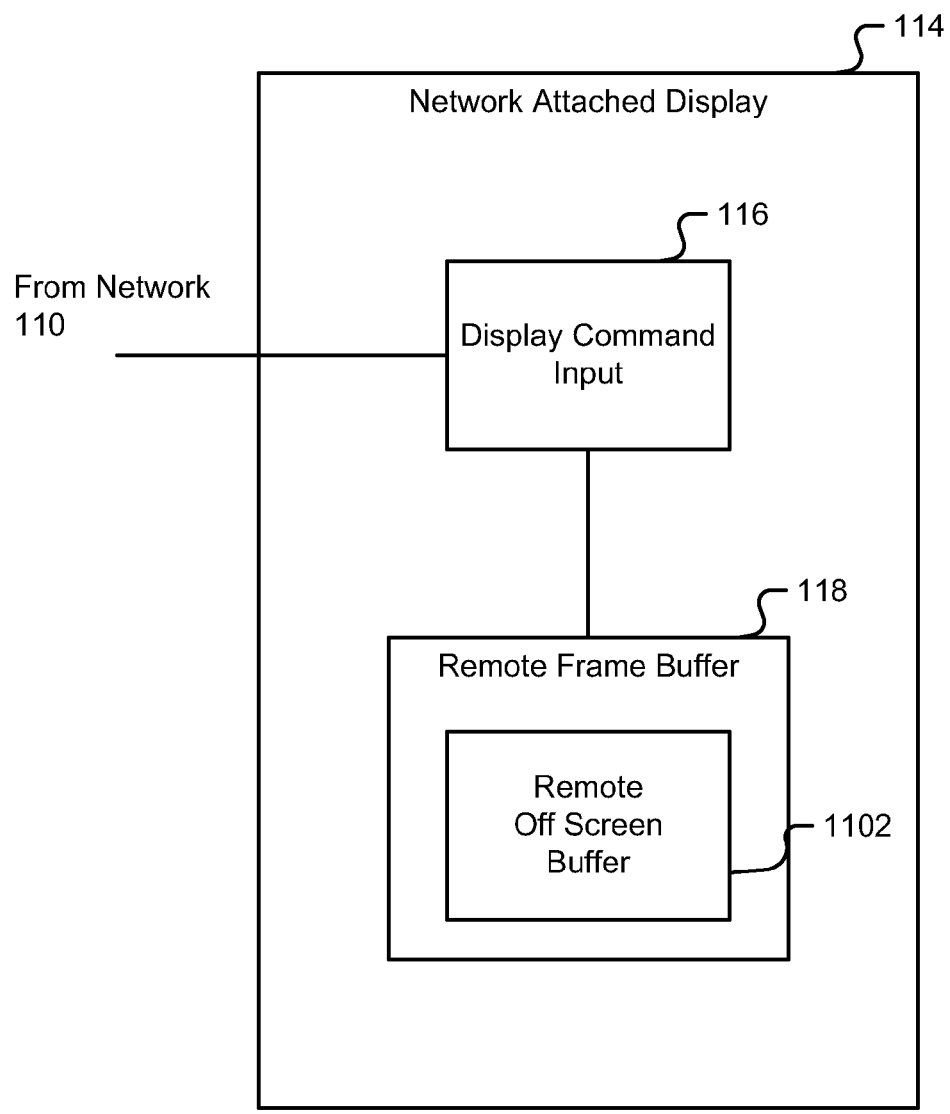
FIG. 11 is a block diagram illustrating an embodiment of a network attached display and its comprised components operating as a remote display device over a network.

FIG. 11 is a block diagram illustrating an embodiment of a network attached display and its comprised components operating as a remote display device over a network. An objective is to attempt to ensure that as frames appear on the network attached display, they appear all at once rather than drawn slowly or perceptible to the user.

Bitmaps are sent by the network output processor 306 to the network attached display 114, and the network attached display 114 receives those bitmaps from the network into the remote frame buffer 118. If the network is slow, then there is an unwanted effect that the user may perceive the actual frames being drawn slowly. For example, if it takes 150 ms to transfer a frame over the network, then a user watching the screen of a network attached display will see each frame draw over a 150 ms period.

In one embodiment, the physical size of the remote frame buffer 118 is significantly larger than required. For example, a 1920×1200 display with 24-bit color will require a total of 6.75 MBytes of frame buffer. However, many memories are significantly larger than this, such as 16 or 32 Mbytes. Hence, the additional space in the frame buffer can be used to store bitmaps that are not on the actual screen. The video driver 106 has knowledge of the size of the frame buffer 118 and can reserve additional space for off screen use. This is called remote off screen buffer 1102.

The network output processor 306 may direct bitmaps destined to the network attached display 114 to go directly to the remote off screen buffer 1102, and then issue a subsequent remote copy command to copy the bitmap from the off screen buffer 1102 to the on-screen portion of the frame buffer 118. By doing so, the appearance of the bitmap becomes instantaneous to the user as opposed to being drawn over a longer period of time. Hence, whenever the network output processor 306 processes a bitmap command flagged as part of a video, it may direct that video frame bitmap to the off screen remote buffer 1102, and follow it with a subsequent remote copy command to copy that bitmap on screen.

Figure 12:
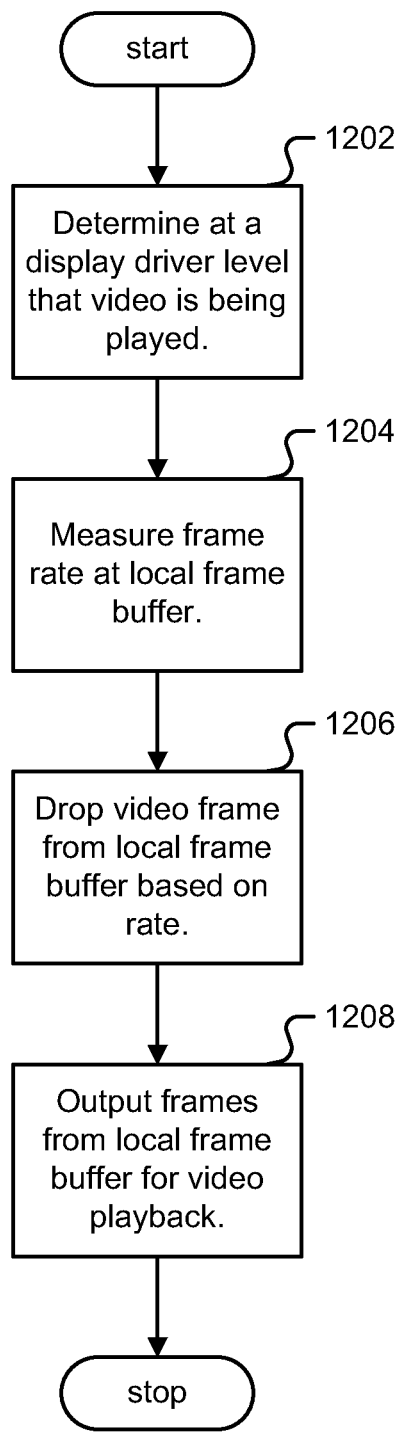
FIG. 12 is a flowchart illustrating an embodiment for processing display operations to provide a positive user experience.

FIG. 12 is a flowchart illustrating an embodiment for processing display operations to provide a positive user experience. The process of FIG. 12 may be implemented by display driver 106.

In step 1202 it is determined at a display driver level that a video is being played. In one embodiment, determining includes comparing a blt operation size against a threshold. In one embodiment, determining includes logging a timestamped entry in a data structure indexed by coordinate. In one embodiment, determining includes comparing a blt operation against a second blt operation at a similar coordinate.

In step 1204 a frame processing rate is measured at a local frame buffer, wherein the frame processing rate is dependent on a performance condition. In one embodiment, the performance condition is low CPU bandwidth. In one embodiment, the performance condition is high network latency. In one embodiment, the performance condition is low network bandwidth. In one embodiment, measuring includes measuring frame processing time. In one embodiment, measuring includes calculating average frame processing time.

In step 1206 a video frame is dropped from the local frame buffer based at least in part on the frame processing rate. In one embodiment, dropping includes not generating the video frame. In one embodiment, dropping includes skipping the video frame in the local frame buffer, wherein the video frame is already generated. In one embodiment, dropping includes using a keep-drop pattern.

In step 1208 frames are output from the local frame buffer for video playback. In one embodiment, outputting includes copying a frame from the local frame buffer to a remote frame buffer, and in a further refined embodiment, outputting includes using a remote copy command. In one embodiment outputting includes copying a frame from the local frame buffer over a thin network to a remote frame buffer.

In various embodiments, it is further determined at a display driver level that the video being played is an irregular video, and dropping the video frame from the local frame buffer is also based on an irregular video frame period threshold. In various embodiments, it is further determined at a display driver level that the video being played is a regular video.

In summary, a display driver 106 operating a network attached display 114 over a network 110 processing sequences of display operations to provide a positive user experience is disclosed. The display driver 106 employs a set of steps and/or rules for processing a sequence of operations, where the set of rules to be used are selected based on an analysis of the operations.

A display driver 106 operating a network attached display 114 over a network 110 may take special care when sending video to the network attached display, including:
    detecting when a video is being played;
    determining the location, width, and height of the video;
    determining if the frame period of the video is regular or it is irregular; and
    determining what the frame period of the video is.

Furthermore, the display driver 106 may intentionally drop frames to produce a more regular frame update period and pattern into the remote frame buffer, and adjust the period and drop pattern dynamically depending on measured performance.

Furthermore, to keep frames whole and non-tearing a display driver may utilize both a local off screen buffer 308 and remote off screen buffer 1102 as well as a remote copy command. A network attached display 114 receiving video over a network 110 from a display driver 106 may allow a portion of its frame buffer to be utilized as remote off screen buffer 1102 and may implement remote copy commands for the purpose of copying video frames from remote off screen buffer 1102 to the remote frame buffer 118.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   determining at a display driver level remote from a thin client that a video is being played;
   measuring a frame processing rate at a local frame buffer remote from the thin client, wherein the frame processing rate is dependent on a performance condition;
   dropping a video frame from the local frame buffer based at least in part on the frame processing rate; and
   outputting frames from the local frame buffer to the remote thin client for video playback.

2. The method as recited in claim 1, further comprising determining at the display driver level that the video being played is an irregular video; and wherein the dropping the video frame from the local frame buffer is further based on an irregular video frame period threshold and wherein the performance condition comprises condition on a network between the display driver level and the remote thin client.

3. The method as recited in claim 2, wherein the determining that the irregular video is being played includes comparing adjacent in time bit-level block transfer (blt) operations to each other.

4. The method as recited in claim 1, further comprising determining at the display driver level that the video being played is a regular video.

5. The method as recited in claim 1, wherein the outputting includes copying a frame from the local frame buffer to a remote frame buffer of the remote thin client.

6. The method as recited in claim 5, wherein the outputting includes using a remote copy command.

7. The method as recited in claim 1, wherein the outputting includes copying a frame from the local frame buffer over a thin network to a remote frame buffer of the thin client which cannot process driver level messages.

8. The method as recited in claim 1, wherein the determining comprising comparing a bit-level block transfer (blt) operation size with a threshold and determining whether the video is being played or the blt operation is for data other than the video based on the size of the blt.

9. The method as recited in claim 1, wherein the determining includes logging a timestamped entry in a data structure indexed by a coordinate to determine whether the video is a regular video or an irregular video.

10. The method as recited in claim 1, wherein the determining includes comparing a bit-level block transfer (blt) operation against a second blt operation at a similar coordinate.

11. The method as recited in claim 1, wherein the performance condition is low CPU bandwidth of a host which comprises the display driver level.

12. The method as recited in claim 1, wherein the performance condition is a high network latency in the network between the display driver level and the remote thin client.

13. The method as recited in claim 1, wherein the performance condition is low network bandwidth in the network between the display driver level and the remote thin client.

14. The method as recited in claim 1, wherein the measuring includes measuring frame processing time.

15. The method as recited in claim 1, wherein the measuring includes calculating average frame processing time.

16. The method as recited in claim 1, wherein the dropping includes not generating the video frame.

17. The method as recited in claim 16, wherein the dropping includes using a keep-drop pattern.

18. The method as recited in claim 1, wherein the dropping includes skipping the video frame in the local frame buffer, wherein the video frame is already generated.

19. The method as recited in claim 18, wherein the dropping includes using a keep-drop pattern.

20. A server, comprising:
    a processor;
    a local frame buffer; and
    a display driver coupled with the processor and the local frame buffer, wherein the display driver is configured to provide the processor with instructions which when executed cause the processor to:
    determine that a video is being played;
    measure a frame processing rate at a local frame buffer, wherein the frame processing rate is dependent on a performance condition;
    drop a video frame from the local frame buffer based at least in part on the frame processing rate; and
    output frames from the local frame buffer of the server to a remote thin client which plays back the video based on the output from the display driver of the server.

21. A network attached display, comprising:
    a client frame buffer;
    a display; and
    a network interface coupled with the client frame buffer and the display, wherein the network interface receives commands from a remote server, wherein the server is configured to:
    determine at a display driver level that a video is being played;
    measure a frame processing rate at a server frame buffer, wherein the frame processing rate is a dependent on a performance condition;
    drop a video frame from a frame buffer of the server based at least in part on the frame processing rate; and
    copy frames from the frame buffer of the remote server to the client frame buffer for playing the video on the display.

22. A non-transitory computer readable storage medium storing executable computer instructions comprising:
    determining at a display driver level remote from a thin client that a video is being played;
    measuring a frame processing rate at a local frame buffer remote from the thin client, wherein the frame processing rate is a dependent on a performance condition;
    dropping a video frame from the local frame buffer based at least in part on the frame processing rate; and
    outputting frames from the local frame buffer to the remote thin client for video playback.

23. The network attached display of claim 21, wherein the network attached display excludes an instruction based processing element and cannot not interpret driver level messages and wherein the performance condition comprises status of a network between the display driver and the remote thin client.

24. The network attached display of claim 21, wherein the network attached display excludes a central processing unit, a microcontroller unit, and a digital signal processor and wherein the video frame is dropped prior to the outputting and the video playback.

25. The method as recited in claim 1, wherein the determining comprises determining a size of a bit-level block transfer (blt) operation, comparing the determined size of the blt operation to a threshold, and determining whether the blt operation is for the video based on the comparison, wherein if the size of the blt operation is above the threshold, the blt operation is determined to relate to the video and if the size of the blt operation is equal to or below the threshold, the blt operation is determined to relate to data types other than video data type.

26. The method as recited in claim 25, wherein the determining further comprises if the blt operation is determined to relate to the video, comparing a time stamp of the blt operation to timestamps of neighboring blt operations, and determining whether the video is a regular video or an irregular video based on the comparing and wherein based on the determining whether the video is the regular video or the irregular video, adjusting the frame processing rate which determines a rate of dropping video frames.

27. The method as recited in claim 1,
wherein the method is performed by a server comprising a display driver, and
wherein the remote thin client does not comprise a display driver but is instead is associated with the display driver of the server over a network.

* * * * *